US009712740B2

United States Patent
Tsutsumi

(10) Patent No.: US 9,712,740 B2
(45) Date of Patent: Jul. 18, 2017

(54) IMAGE PROCESSING APPARATUS, IMAGING APPARATUS, IMAGE PROCESSING METHOD, AND STORAGE MEDIUM

(71) Applicant: CANON KABUSHIKI KAISHA, Tokyo (JP)

(72) Inventor: Shohei Tsutsumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/370,917

(22) Filed: Dec. 6, 2016

(65) Prior Publication Data

US 2017/0085780 A1 Mar. 23, 2017

Related U.S. Application Data

(63) Continuation of application No. 14/799,317, filed on Jul. 14, 2015, now Pat. No. 9,544,572.

(30) Foreign Application Priority Data

Jul. 16, 2014 (JP) ................................. 2014-145920

(51) Int. Cl.
*H04N 5/232* (2006.01)
*H04N 13/02* (2006.01)
*G06T 5/00* (2006.01)
*G06T 5/20* (2006.01)
*G06T 5/50* (2006.01)

(52) U.S. Cl.
CPC ......... *H04N 5/23212* (2013.01); *G06T 5/003* (2013.01); *G06T 5/20* (2013.01); *G06T 5/50* (2013.01); *H04N 13/0225* (2013.01); *G06T 2200/21* (2013.01); *G06T 2207/10012* (2013.01); *G06T 2207/10052* (2013.01);
(Continued)

(58) Field of Classification Search
CPC ............ H04N 5/23212; H04N 13/0225; G06T 5/003; G06T 5/20; G06T 5/50; G06T 2200/21; G06T 2207/10012; G06T 2207/10052; G06T 2207/20101; G06T 2207/20104
See application file for complete search history.

(56) References Cited

U.S. PATENT DOCUMENTS 8,345,144 B1 * 1/2013 Georgiev ............... G03B 11/00
348/335
2008/0131019 A1 6/2008 Ng
(Continued)

*Primary Examiner* — Tuan Ho
(74) *Attorney, Agent, or Firm* — Canon USA, Inc. IP Division

(57) ABSTRACT

There is provided an image processing apparatus for displaying a region in focus in a refocused image to be output in such a manner that a user can easily recognize this region compared to displaying the refocused image without any arrangement made thereto. The image processing apparatus includes a first generation unit configured to generate an image in which an image region corresponding to an in-focus position in the refocused image is emphasized as a display image, an input unit configured to input a user instruction, which is an image output instruction, input based on a display of the display image, and an output unit configured to output the refocused image according to the user instruction.

11 Claims, 14 Drawing Sheets

(52) U.S. Cl.
CPC ............... *G06T 2207/20101* (2013.01); *G06T 2207/20104* (2013.01)

(56) References Cited

U.S. PATENT DOCUMENTS

2014/0160319 A1* 6/2014 Nestares ................ H04N 5/262
 348/239
2015/0161797 A1* 6/2015 Park ...................... G06T 7/0075
 382/154

* cited by examiner

IMAGE PROCESSING APPARATUS, IMAGING APPARATUS, IMAGE PROCESSING METHOD, AND STORAGE MEDIUM

CROSS-REFERENCE TO RELATED APPLICATION

This application is a Continuation of U.S. application Ser. No. 14/799,317, filed Jul. 14, 2015, which claims priority from Japanese Patent Application No. 2014-145920 filed Jul. 16, 2014, which are hereby incorporated by reference herein in their entireties.

BACKGROUND OF THE INVENTION

Field of the Invention

The present invention relates to a technique for presenting a display for refocusing processing.

Description of the Related Art

There is known a technique for adjusting an in-focus state of an image after capturing the image thereof by combining a plurality of images acquired by imaging an object from a plurality of viewpoints or adding a blur to the image by filter processing based on distance information of the object (refocusing). The refocusing processing allows generation of such an image that an in-focus position, which is a position in focus in the captured image, or a depth of field, which indicates a depth range of a region appearing to be in focus, is changed (a refocused image). United States Patent Publication Application No. 2008/0131019 discusses that a user specifies a position that the user wants to bring into focus by refocusing, by which a refocused image in focus at a desired position is generated and is displayed to the user.

The technique discussed in United States Patent Publication Application No. 2008/0131019 involves such a situation that, in a case where the refocused image is displayed on a screen having low resolution, such as a display mounted on a back surface of a camera, it is difficult for the user to determine which region is brought into focus in the output refocused image.

SUMMARY OF THE INVENTION

According to an aspect of the present invention, an image processing apparatus includes an acquisition unit configured to acquire image data representing a captured image, a first input unit configured to input a first user instruction indicating an in-focus position of a refocused image for generating the refocused image, wherein the in-focus position is a position to be in focus in an image and the refocused image is an image in which the in-focus position of the captured image represented by the image data is changed, a first generation unit configured to generate a display image to be displayed according to the first user instruction, a second input unit configured to input a second user instruction, which is an image output instruction, input onto the display image, and an output unit configured to output the refocused image in focus at the in-focus position according to the second user instruction. The display image is an image in which an image region corresponding to the in-focus position is emphasized compared to in the refocused image.

Further features of the present invention will become apparent from the following description of exemplary embodiments with reference to the attached drawings.

DESCRIPTION OF THE EMBODIMENTS

Figure 1:
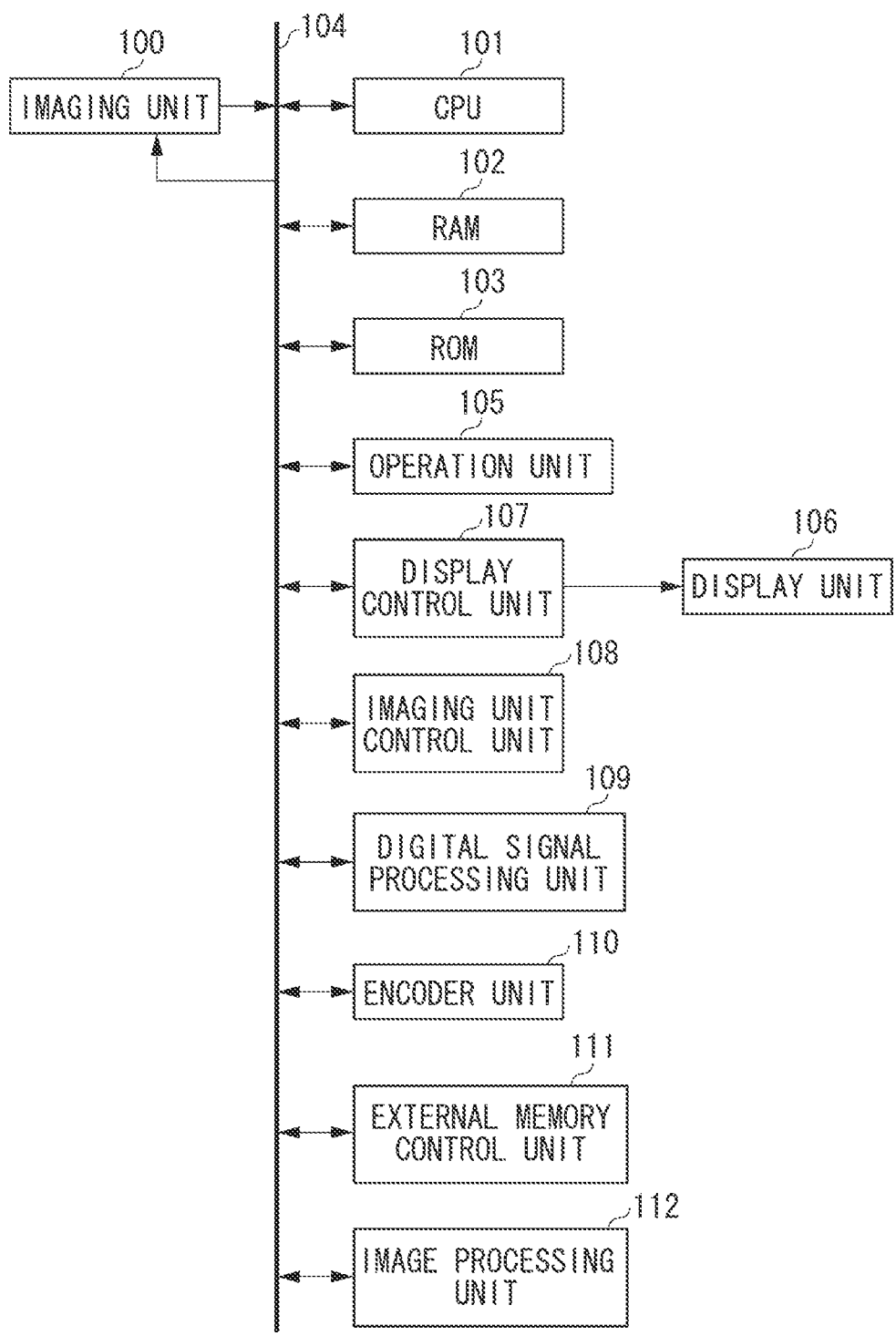
FIG. 1 is a block diagram illustrating an internal configuration of an imaging apparatus.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

A first exemplary embodiment will be described as an example in which, when a refocused image generated from an image captured with use of an imaging apparatus is displayed on a display having low resolution, a region in focus in the refocused image is highlighted. First, a configuration of an imaging apparatus according to the present exemplary embodiment will be described. Similar components will be identified by the same reference numerals, and descriptions thereof will be omitted. FIG. 1 is a block diagram illustrating an internal configuration of the imaging apparatus according to the present exemplary embodiment.

An imaging unit 100 is a camera unit that receives light information of an object by an image sensor, and performs an analog/digital (A/D) conversion on the received signal, thereby acquiring image data. The imaging unit 100 acquires the image data in response to an imaging instruction issued by a user that is input via an operation unit 105 or the like, and the acquired image data is stored in a recording medium as captured image data. The imaging unit 100 acquires image data containing information about a plurality of images having a parallax among them, which are acquired by imaging the same object from a plurality of viewpoints (hereinafter referred to as parallax image data), in response to a single imaging instruction. Further, the image data acquired by the imaging unit 100 is also used for a so-called live view function of presenting a real-time display on a display unit 106 mounted on a back surface of the imaging apparatus.

A central processing unit (CPU) 101 is a processor that comprehensively controls individual component units in the imaging apparatus. A random access memory (RAM) 102 is a memory that functions as, for example, a main memory and a work area of the CPU 101. Further, a read only memory (ROM) 103 is a memory that stores, for example, a control program to be executed by the CPU 101. A bus 104 is a transmission path for various kinds of data, and for example, the image data acquired by the imaging unit 100 is transmitted to a predetermined processing unit via this bus 104. The operation unit 105 is an input device that inputs an instruction provided from the user into the imaging apparatus, and the operation unit 105 includes hardware such as a button and a mode dial. The display unit 106 is a display device that displays an image and a character. In the present exemplary embodiment, a liquid crystal display is used as the display unit 106. The display unit 106 may have a touch input function as a touch screen, and in this case, the display unit 106 is in charge of a part of functions of the operation unit 105. The display unit 106 according to the present exemplary embodiment has the touch input function as the touch screen, and the user specifies a focus position in the refocusing processing by a touch input via the display unit 106.

A display control unit 107 is a control circuit that performs display control of the image and the character to be displayed on the display unit 106. An imaging unit control unit 108 is a control circuit that performs control of an imaging system of the imaging unit 100, such as focusing the imaging system, opening or closing a shutter, and adjusting an aperture diaphragm, based on an instruction from the CPU 101. A digital signal processing unit 109 is a processing circuit that performs various kinds of image processing, such as white balance processing, gamma processing, and noise reduction processing, on the image data received via the bus 104. An encoder unit 110 is a processing circuit that performs processing for converting the image data received via the bus 104 into a file format such as JPEG and MPEG. An external memory control unit 111 is an interface for connecting the imaging apparatus to a personal computer (PC) and another medium (e.g., a hard disk, a memory card, a CompactFlash (CF) card, a Secure Digital (SD) card, and a universal serial bus (USB) memory). The image data acquired and generated by the imaging apparatus can be output (stored) into an external storage device via this external memory control unit 111. An image processing unit 112 is a processing circuit that performs image processing such as the refocusing processing that will be described below, and generation of a display image with use of the image data acquired by the imaging unit 100 or the image data output from the digital signal processing unit 109. This is the configuration of the imaging apparatus according to the present exemplary embodiment.

Figure 2:
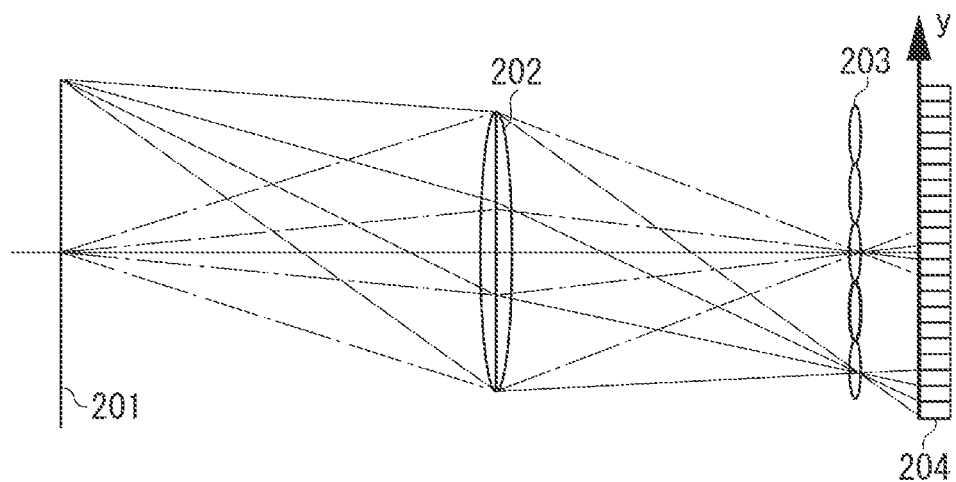
FIG. 2 illustrates a configuration example of an imaging unit.

Next, a configuration of an optical system of the imaging unit 100 will be described in detail with reference to FIG. 2. The optical system of the imaging unit 100 includes a main lens 202, a lens array 203, and an image sensor 204. This configuration is a simple version for simplifying the description, and actually, the imaging unit 100 further includes the aperture diaphragm, a color filter, and the like. Further, the main lens 202 may be an optical system using a plurality of lenses. The lens array 203 is an optical element including a plurality of micro convex lenses arranged in a two-dimensional array, and is disposed on an image-side conjugate plane of an object surface 201 with respect to the main lens 202. Further, the image sensor 204 is disposed at a position that causes an exit pupil of the main lens 202 and the image sensor 204 to have a substantially conjugate relationship therebetween via the lens array 203. The camera configured in this manner is called a Plenoptic camera, and can capture an image containing information regarding a direction in which a light ray is incident. In the following description, a principle thereof will be described.

Assume that a light ray emitted from the object surface 201 is received by the image sensor 204. All of light rays emitted from a single point of the object surface 201 and incident on the main lens 202 are imaged on a single point on the lens array 203 regardless of directions in which the light rays are emitted. However, the lens array 203 functions to cause the individual light rays imaged on the lens array 203 to be each emitted in a different direction according to an incident angle thereof, and be each incident on a different pixel on the image sensor 204. In other words, this configuration results in that the light rays emitted from the object at different angles, i.e., the light rays observed when the object is viewed from different directions are recorded on the image sensor 204 while being distinguished from one another. Therefore, this configuration results in that the image captured by the Plenoptic camera contains information about the object viewed from a plurality of different viewpoints. Then, from which direction a light ray corresponding to each pixel is incident can be determined by a calculation, whereby even a plurality of images corresponding to the plurality of different viewpoints can be acquired by extracting and rearranging pixels corresponding to light rays transmitted through the same region on the main lens 202.

Figure 3:
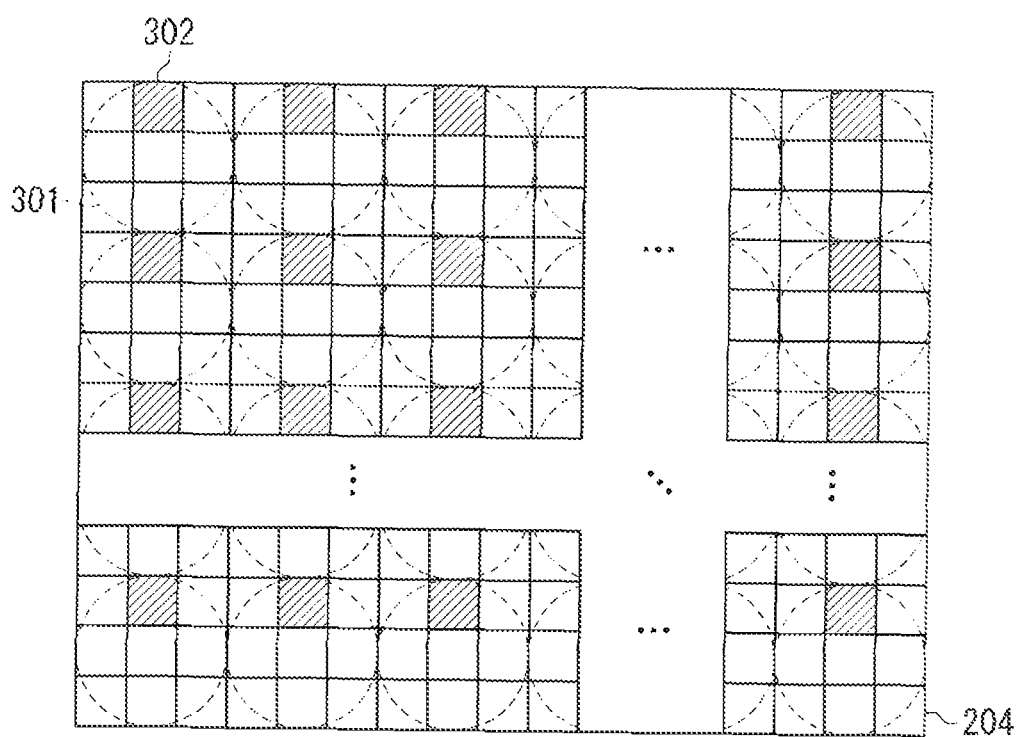
FIG. 3 illustrates a relationship between an image sensor and a lens array.

FIG. 3 illustrates a corresponding relationship between the image sensor 204 and the lens array 203. A circle 301 represents a convex lens in the lens array 203, and a quadrilateral 302 represents a pixel in the image sensor 204. Each convex lens in the lens array 203 corresponds to nine pixels, and can distribute the light rays emitted from the object surface 201 to the nine pixels for each of regions on the main lens 202 through which the individual light rays are transmitted. More specifically, assuming that a long-side direction and a short-side direction of the image sensor 204 are a horizontal direction and a vertical direction, respectively, the imaging unit 100 in the present exemplary embodiment can distinguish the light rays corresponding to horizontally arrange three viewpoints×vertically arranged three viewpoints, i.e., nine viewpoints in total. For example, each of pixels illustrated as shaded portions in FIG. 3 is a pixel corresponding to a light ray transmitted through a top center of the main lens 202, and an object image observed from a viewpoint at the top center of the main lens 202 can be acquired by extracting and arranging these pixels illustrated as the shaded portions. This is the details of the imaging unit 100 of the imaging apparatus according to the present exemplary embodiment.

The configuration of the imaging apparatus according to the present invention is not limited to the above-described configuration, and may be a configuration with a part of the component units thereof omitted or replaced with another component unit. Further, another component unit that has been not described in the above description may be added. In addition, the configuration of the imaging unit 100 is also not limited to the above-described configuration, and the imaging apparatus may use an imaging unit configured in any manner, such as an imaging unit including a plurality of camera units arranged therein, as long as the imaging unit is configured to be able to acquire the images formed by imaging the object from the plurality of viewpoints at the same time.

Figure 4:
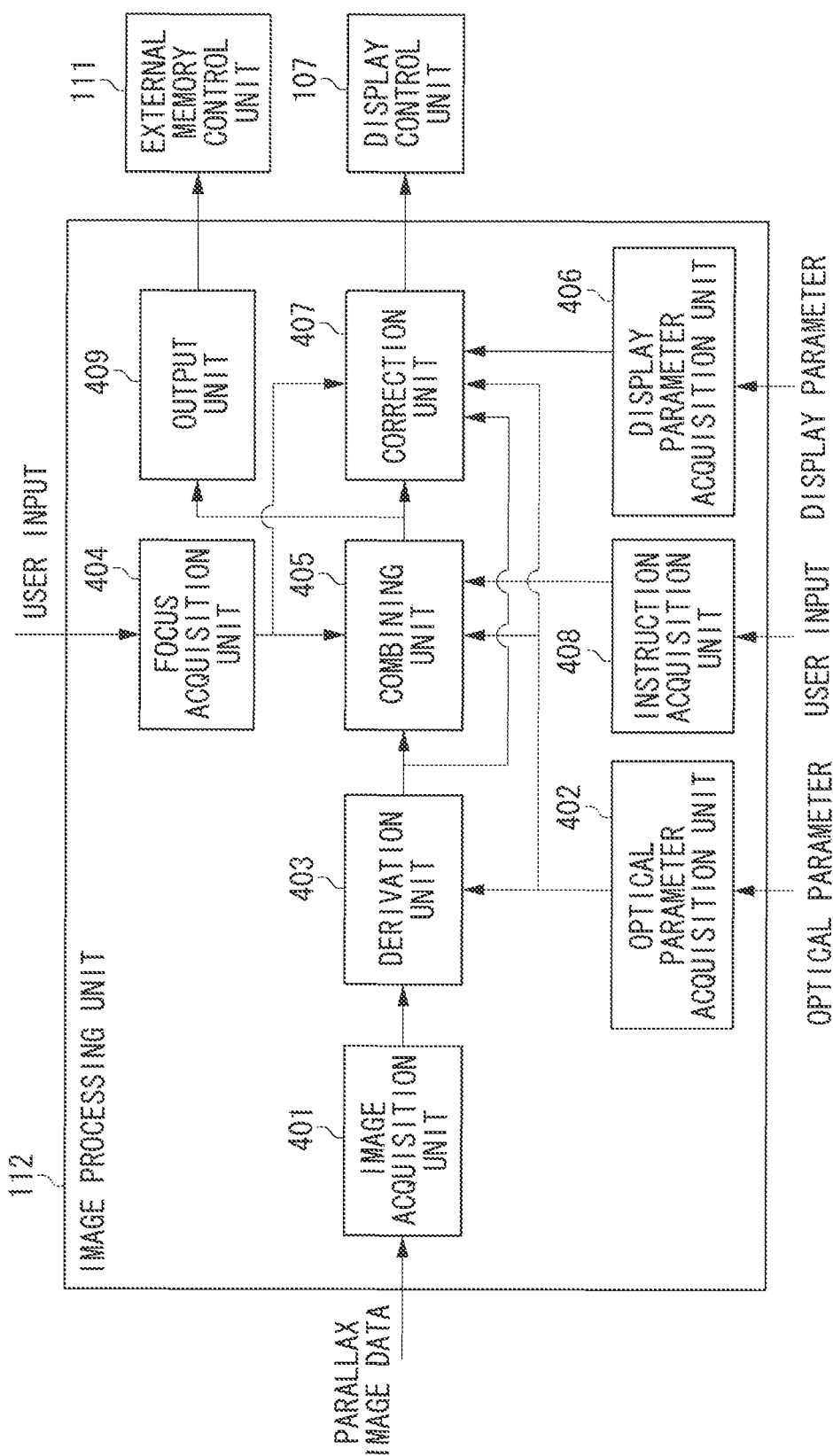
FIG. 4 is a block diagram illustrating a configuration of an image processing unit according to a first exemplary embodiment.
Figure 5:
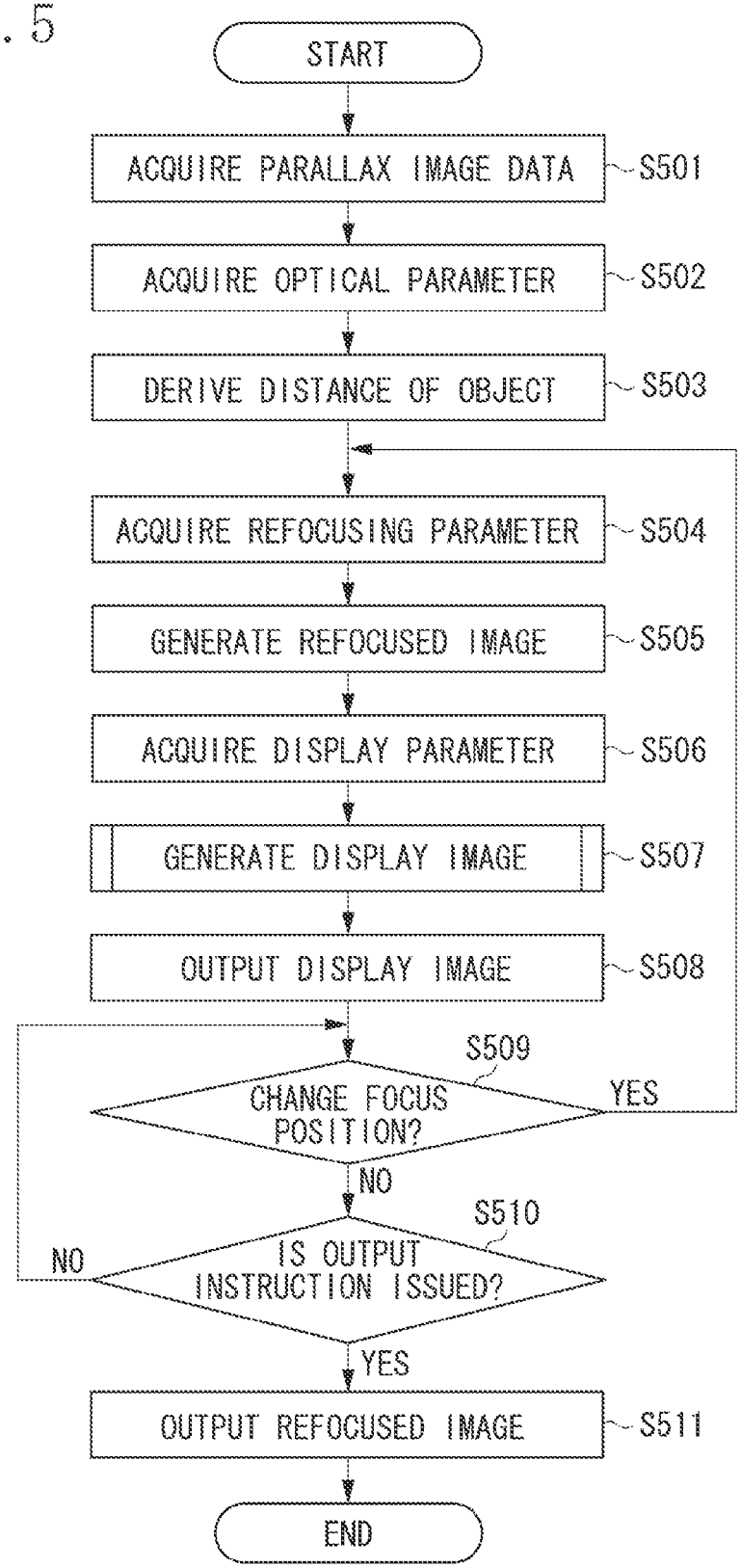
FIG. 5 is a flowchart illustrating a flow of processing according to the first exemplary embodiment.

Next, processing performed by the imaging apparatus according to the present exemplary embodiment will be described. FIG. 4 is a block diagram illustrating a configuration of the image processing unit 112, and FIG. 5 is a flowchart illustrating a flow of processing performed by the image processing unit 112. The CPU 101 reads in a program for executing the flowchart illustrated in FIG. 5 that is stored in the ROM 103 to control the image processing unit 112 as each of component units illustrated in FIG. 4, by which the imaging apparatus according to the present exemplary embodiment performs the refocusing processing and generates the display image. The imaging apparatus according to the present exemplary embodiment may be configured to realize the processing illustrated in FIG. 5 with use of hardware into which each of the component units of the image processing unit 112 is prepared as an independent processing circuit. In the following description, details of the processing performed by the image processing unit 112 will be described with reference to FIGS. 4 and 5.

In step S501, an image acquisition unit 401 acquires the parallax image data input via the bus 104, and outputs the acquired parallax image data to a derivation unit 403. The parallax image data acquired at this time may be the live view image data directly input from the imaging unit 100, or may be the image data acquired by the imaging unit 100 and recorded in an external memory via the external memory control unit 111.

In step S502, an optical parameter acquisition unit 402 acquires an optical parameter used in imaging of the image data acquired in step S501, and outputs the acquired optical parameter to the derivation unit 403, a combining unit 405, and a correction unit 407. Examples of the optical parameter acquired at this time include a focal length of the lens, a distance between the lens and the sensor, a size of the diaphragm, a sensor size of the image sensor 204, and the number of pixels of the image sensor 204. The imaging apparatus according to the present exemplary embodiment may be configured in such a manner that the optical parameter is output from the imaging unit 100, or may be configured in such a manner that the optical parameter acquisition unit 402 acquires a parameter stored as a design parameter of the imaging unit 100 in the ROM 103 or the external memory. Alternatively, the imaging apparatus according to the present exemplary embodiment may be configured in such a manner that the image acquisition unit 401 acquires the optical parameter as metadata of the parallax image data.

In step S503, the derivation unit 403 derives distance information that indicates a distance of an object corresponding to each pixel position in the parallax image data based on the parallax image data input from the image acquisition unit 401 and the optical parameter input from the optical parameter acquisition unit 402. The distance information derived at this time is a distance image (a distance map) in which the distance at each pixel position is expressed as a pixel value. The distance map can be acquired by a method such as performing stereo matching among the images of the individual viewpoints represented by the parallax image data. Examples of another method usable as the method for acquiring the distance map include the Depth From Defocus (DFD) method with use of a difference among blur states of the plurality of images, and the active ranging method with use of an infrared ray. In the present exemplary embodiment, the method for acquiring the distance map will be described assuming that the stereo matching method is employed.

In the stereo matching method, the distance to the object corresponding to each pixel is calculated based on how much the points corresponding to the same object are displayed while being displaced from one another in the images among the images captured from the different viewpoints. In the stereo matching method, first, a viewpoint serving as a criterion for deriving the distance map (a criterion viewpoint) is determined, and block matching is performed between an image corresponding to the criterion viewpoint and an image corresponding to a reference viewpoint that is a comparison target. This block matching can locate at which position a point located at a certain position in the image corresponding to the criterion viewpoint is located in the image corresponding to the reference viewpoint. A displacement amount of each point among the images corresponding to the different viewpoints depends on the object distance corresponding to this point and the optical parameter used when each of the images was captured, whereby an object distance d can be calculated based on the following relational expression.

$$d = \frac{p_{pix} l (1 + \cos\alpha)}{2 l_{pix} \sin\alpha} \qquad \text{Expression (1)}$$

In this expression, α represents an angle of view of the imaging unit 100, l represents an inter-viewpoint distance between the criterion viewpoint and the reference viewpoint, $l_{pix}$ represents a pixel displacement amount of the corresponding point, and $p_{pix}$ represents the total number of pixels in each of the images in a direction in which the pixel is displaced. The derivation unit 403 calculates the object distance d with respect to each pixel by substituting the optical parameter input from the optical parameter acquisition unit 402 and a result of the block matching into the expression (1), and outputs the generated distance map to the combining unit 405 and the correction unit 407.

Figure 6A:
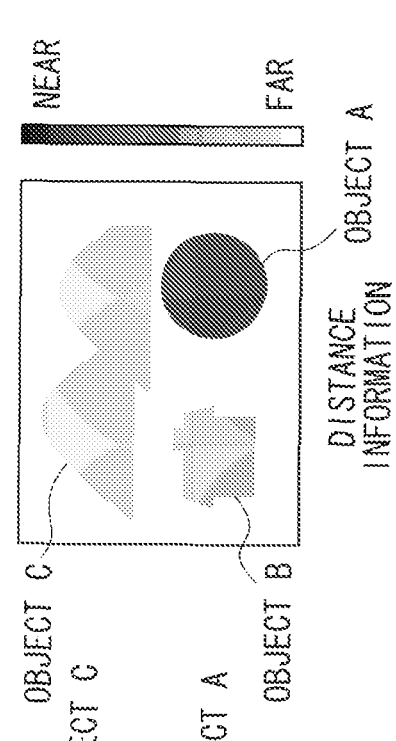
FIGS. 6A, 6B, 6C, and 6D illustrate an example of a distance map.
Figure 6B:
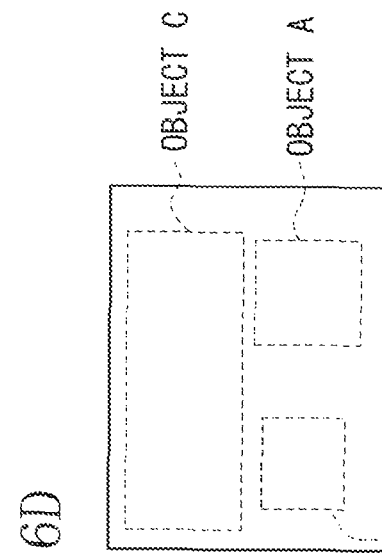

FIGS. 6A, 6B, 6C, and 6D illustrate an example of the distance map generated at this time. FIG. 6A illustrates an image corresponding to one of the viewpoints represented by the parallax image data imaged by the imaging unit 100, and FIG. 6B illustrates a distance map generated with respect to the image illustrated in FIG. 6A. The image illustrated in FIG. 6A contains images of three kinds of objects (objects A, B, and C) located at different positions from the imaging apparatus. In the distance map illustrated in FIG. 6B, a distance of each of the objects A, B, and C from the imaging apparatus is indicated by a shade of a color. The object located close to the imaging apparatus is displayed in a dark color, while the object located away from the imaging apparatus is displayed in a light color.

Figure 6C:
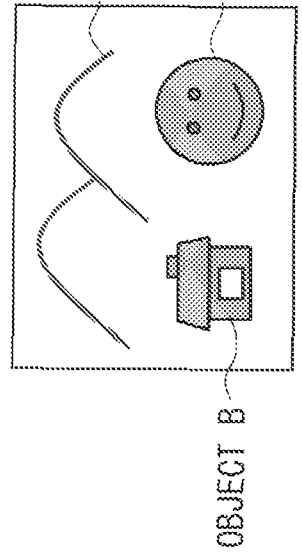
Figure 6D:
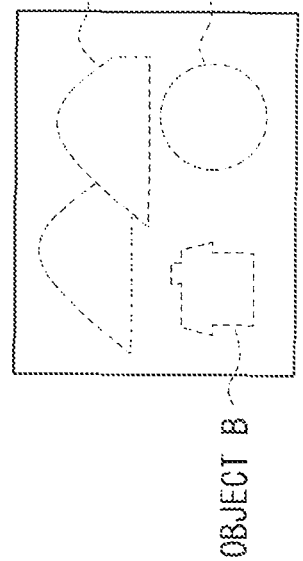

FIGS. 6C and 6D each illustrate one example of a result of extracting an object region corresponding to each of the objects A, B, and C from the distance map illustrated in FIG. 6B. FIG. 6C illustrates an example of extracting the object region along a contour of each of the objects A, B, and C, and FIG. 6D illustrates an example of extracting a quadrilateral region circumscribed to each of the objects A, B, and C as the object region. Various methods can be employed as the method for extracting the object region, as long as the region is set so as to contain a main object therein. For example, the object region may be defined by an arbitrary shape, such as a circle, an oval, a triangle, and a polygon.

Figure 7A:
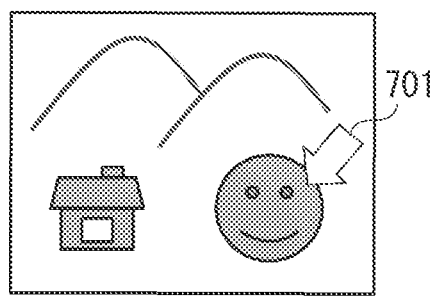
FIGS. 7A, 7B, and 7C each illustrate an example of a method for setting an in-focus position.
Figure 7B:
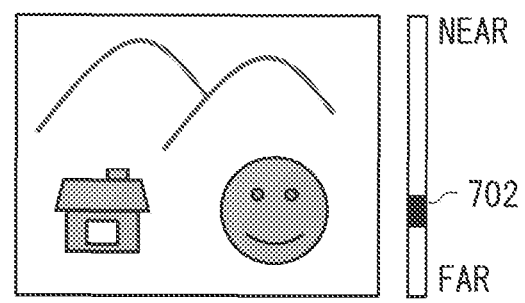

In step S504, a focus acquisition unit 404 acquires a refocusing parameter that indicates a focus position (an in-focus position) at which the image is to be brought into focus in the refocusing processing based on a user instruction input by the user. In the imaging apparatus according to the present exemplary embodiment, the user specifies the in-focus position at which the image is to be brought into focus in the refocusing processing by operating the touch panel provided on the display unit 106. FIGS. 7A and 7B each illustrate an example of a user interface that allows the user to specify the in-focus position. FIG. 7A illustrates an example in which a point touched by the user is set as the in-focus position at which the image is to be brought into focus in the refocusing processing. In this case, a point or a region specified by the user is highlighted with use of an arrow 701, and a distance to an object located at this position is calculated as a focus distance (an in-focus distance) at which a refocused image is to be brought into focus. FIG. 7B illustrates an example in which the user directly sets the in-focus distance. In this case, a slide bar 702 for adjusting the in-focus distance is displayed on the display unit 106, and the user sets a desired in-focus distance by moving the slide bar 702.

Figure 7C:
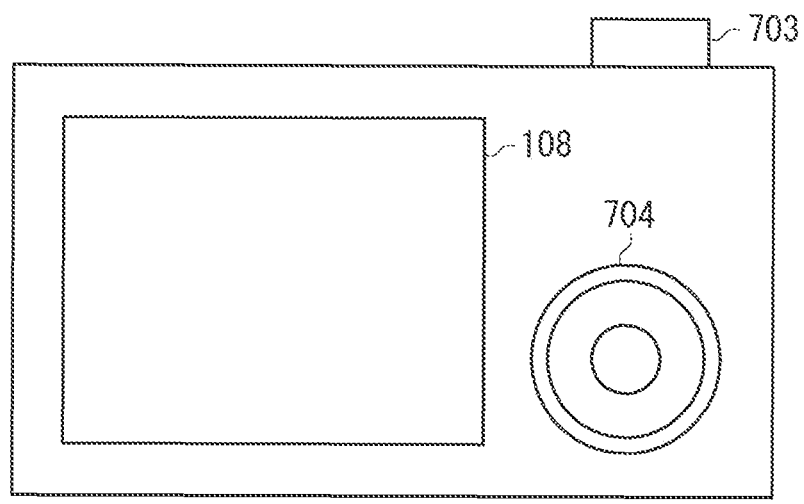
Figure 8A:
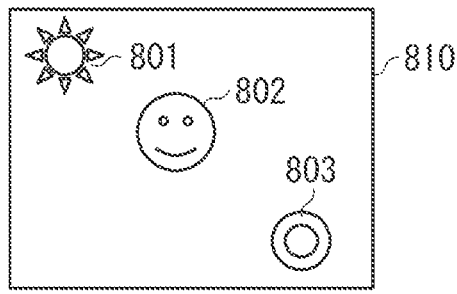
FIGS. 8A, 8B, 8C, 8D, 8E, and 8F illustrate refocusing processing by combining images.
Figure 8B:
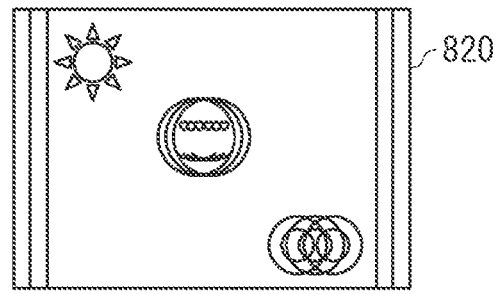
Figure 8C:
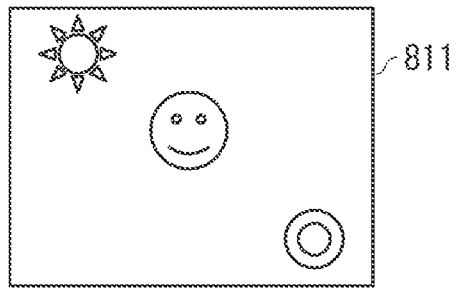
Figure 8D:
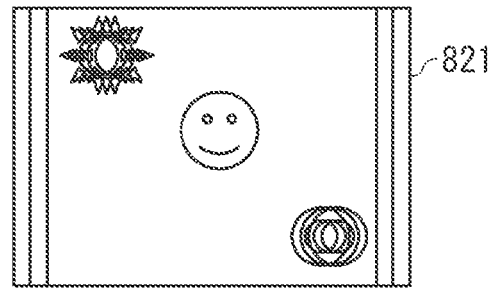
Figure 8E:
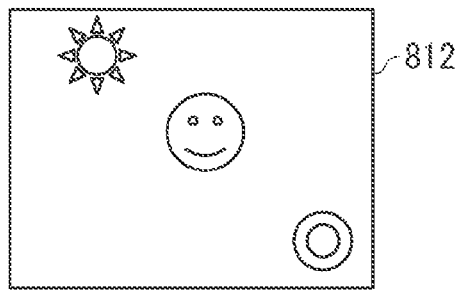
Figure 8F:
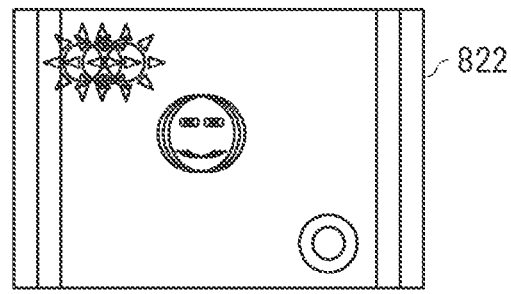

The user interface (UI) used when the user sets the in-focus position or the in-focus distance is not limited to the examples illustrated in FIGS. 7A and 7B. For example, the imaging apparatus according to the present exemplary embodiment may be configured to allow the user to distinguish each of the objects from the other objects with use of region divided images into which the region of the image is divided for each distance, and select an object to be brought into focus in the refocusing processing by operating the button or the mode dial. FIG. 7C illustrates an example in such a case. FIG. 7C illustrates one example of the back surface of the imaging apparatus. Each of a release button 703 and a mode dial 704 is a part of the operation unit 105. The release button 703 is provided with a lever for controlling a zoom mechanism of the imaging unit 100, and the user can change the distance at which the image is to be brought into focus in the refocusing processing by operating this lever. Further, the mode dial 704 is a button that allows the user to provide various inputs by rotating or pressing the mode dial 704 itself, and the imaging apparatus according to the present exemplary embodiment may be configured to allow the user to switch an object to be selected according to the rotation or the pressing of this mode dial 704.

The focus acquisition unit 404 outputs the refocusing parameter acquired at this time to the combining unit 405 and the correction unit 407. The imaging apparatus according to the present exemplary embodiment may be configured to notify the user of a warning and prompt the user to set a new in-focus position within a range that can be refocused, if an in-focus position outside the range that can be refocused is acquired in this step. Alternatively, the imaging apparatus according to the present exemplary embodiment may be configured to acquire an in-focus position closest to the in-focus position specified by the user among in-focus positions within the range that can be refocused, as the in-focus position to be used in refocusing.

In step S505, the combining unit 405 generates the refocused image based on the parallax image data and the distance map input from the derivation unit 403, and the refocusing parameter input from the focus acquisition unit 404. The combining unit 405 according to the present exemplary embodiment generates the refocused image by combining the images of the individual viewpoints represented by the parallax image data while shifting them based on the refocusing parameter input from the focus acquisition unit 404. In the following description, a principle of the refocusing processing will be described with reference to FIGS. 8A to 8F.

FIGS. 8A to 8F illustrate images corresponding to three viewpoints arranged side by side in the horizontal direction among the images of the individual viewpoints represented by the parallax image data, and refocused images acquired by combining these three images. The parallax image data contains an image 810 corresponding to a right viewpoint, an image 811 corresponding to a central viewpoint, and an image 812 corresponding to a left viewpoint, and each of the images 810 to 812 contains images of objects 801 to 803. The object 803, the object 802, and the object 801 are located in this order from a closest position to the imaging apparatus, and a parallax is generated on the image of each of the objects 801 to 803 according to the object distance. Images 820 to 822 are the refocused images acquired by combining these images 810 to 812. Among the images 820 to 822, shift amounts of the images 810 to 812 that are used for their respective combinations are different from one another. The image 820 is an image acquired by combining the images 810 to 812 while shifting them in such a manner that the objects 801 coincide with one another, and is an image in which the object 801 is in focus. On the other hand, because a parallax is generated on each of the objects 802 and 803 by a different degree from the object 801, each of the objects 802 and 803 is combined at a displaced position in the image 820. Therefore, the image 820 is generated as an image in which the object 802 and the object 803 are blurred. At this time, because a difference of the parallax on the object 803 from the parallax on the object 801 is larger than a difference of the parallax on the object 802 from the parallax on the object 801, the object 803 is more blurred than the object 802 in the image 820.

Similarly, the object 802 is in focus and the objects 801 and 803 are blurred in the image 821 acquired by combining the images 810 to 812 while shifting them in such a manner that the objects 802 coincide with one another. Further, the object 803 is in focus and the objects 801 and 802 are blurred in the image 822 acquired by combining the images 810 to 812 while shifting them in such a manner that the objects 803 coincide with one another. A refocused image in focus at a predetermined distance and blurred according to the distance from the in-focus distance can be generated by combining the images of the individual viewpoints represented by the parallax image data while shifting the images based on the shift amount determined according to the object desired to be brought into focus in this manner. The combining unit 405 outputs the refocused image generated by the above-described method to the correction unit 407. Then, the processing proceeds to a next step.

In step S506, a display parameter acquisition unit 406 acquires a display parameter required to generate the display image to be displayed on the display unit 106. The display parameter acquired at this time includes resolution of an image displayable on the display unit 106. The display parameter acquisition unit 406 can acquire the display parameter by reading in it from the ROM 103 or receiving an input from the display control unit 107. The display parameter acquisition unit 406 outputs the acquired display parameter to the correction unit 407, and then the processing proceeds to a next step.

Figure 9A:
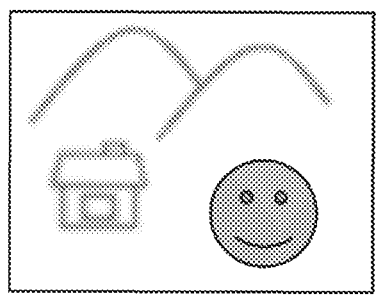
FIGS. 9A, 9B, 9C, and 9D each illustrate an example of a display image.
Figure 9B:
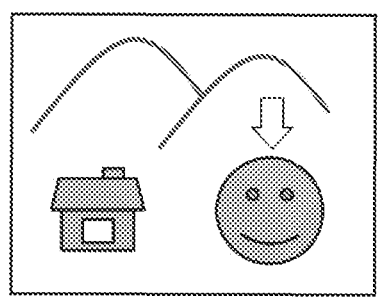
Figure 9C:
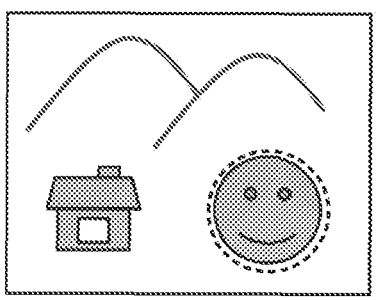
Figure 9D:
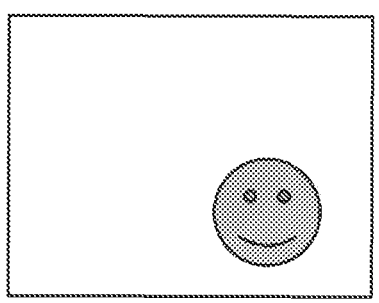

In step S507, the correction unit 407 corrects the refocused image input from the combining unit 405 to generate the display image to be displayed on the display unit 106. FIGS. 9A to 9D each illustrate an example of the display image generated at this time. Any of the images is an image generated by correcting the refocused image in which a person located on the most front side is brought into focus among three objects, the person, a house, and a mountain, and is an image with an emphasis placed on an in-focus region in focus in the refocused image. The image illustrated in FIG. 9A is an image with blur processing performed on an out-of-focus region out of focus in the refocused image, and facilitates recognition of the in-focus region because a difference between the in-focus region and the out-of-focus region is emphasized. The image illustrated in FIG. 9B is an image that allows the user to more easily recognize the object located at the in-focus position by superimposing and displaying a marker (an arrow in FIG. 9B) on a vicinity of the region of the object in focus in the refocused image. The image illustrated in FIG. 9C is an image with an emphasis placed on a contour of the object located in the in-focus region by a frame surrounding the object in focus in the refocused image. Further, the image illustrated in FIG. 9D is a display image set in such a manner that only the image region corresponding to the object in focus is displayed while other image regions are not displayed. The in-focus region in focus in the refocused image is determined based on the distance map input from the derivation unit 403 and the refocusing parameter input from the focus acquisition unit 404. For example, such an image region that a difference between the in-focus distance indicated by the refocusing parameter and the corresponding object distance is within a predetermined threshold value is extracted as the in-focus region, and the above-described processing is performed. A smoothly shaped region can be extracted by applying a smoothing filter, a low-pass filter, or the like to the distance map before the extraction of the in-focus region.

The example of the generated display image is not limited to the above-described examples. For example, the display image may be an image with the in-focus region and the out-of-focus region displayed in different tints. Further, the above-described examples may be combined, and the display image may be an image generated by adding the marker indicating the in-focus region to the image with the blur processing performed on the out-of-focus region. Alternatively, a luminance of the out-of-focus region may be reduced compared to a luminance of the in-focus region to emphasize the in-focus region. The display image may be generated by another processing, as long as the processing can emphasize the in-focus region compared to the out-of-focus region. The correction unit 407 according to the present exemplary embodiment generates the image illustrated in FIG. 9A, in which the blur processing is performed on the out-of-focus region in the refocused image, as the display image. Details of the processing performed at this time will be described below.

In step S508, the correction unit 407 outputs the display image data generated in step S507 to the display control unit 107. The display control unit 107 controls the display unit 106 in such a manner that the input display image data is displayed on the display unit 106.

In step S509, the focus acquisition unit 404 determines whether a new in-focus position is specified by the user based on the changed display. If the focus acquisition unit 404 determines that the new in-focus position is specified by the user (YES in step S509), the processing returns to step S504, in which the focus acquisition unit 404 acquires a new refocusing parameter. If the focus acquisition unit 404 does not determine that the new in-focus position is specified by the user (NO in step S509), the processing proceeds to step S510.

In step S510, an instruction acquisition unit 408 determines whether an instruction to output the refocused image is issued by the user. If the user determines that a refocused image having a desired in-focus state can be acquired by observing the display image generated in step S508, the user can input the instruction to output this refocused image by operating the operation unit 105. If the instruction acquisition unit 408 does not determine that the instruction to output the refocused image is input by the user (NO in step S510), the processing returns to step S509. If the instruction acquisition unit 408 determines that the instruction to output the refocused image is input by the user (YES in step S510), the processing proceeds to step S511.

In step S511, the combining unit 405 receives a signal from the instruction acquisition unit 408, and outputs the image generated with use of the refocusing parameter at that time to an output unit 409. The output unit 409 outputs the refocused image input from the combining unit 405 to the external memory control unit 111 or the like, and then the processing is ended.

Figure 10:
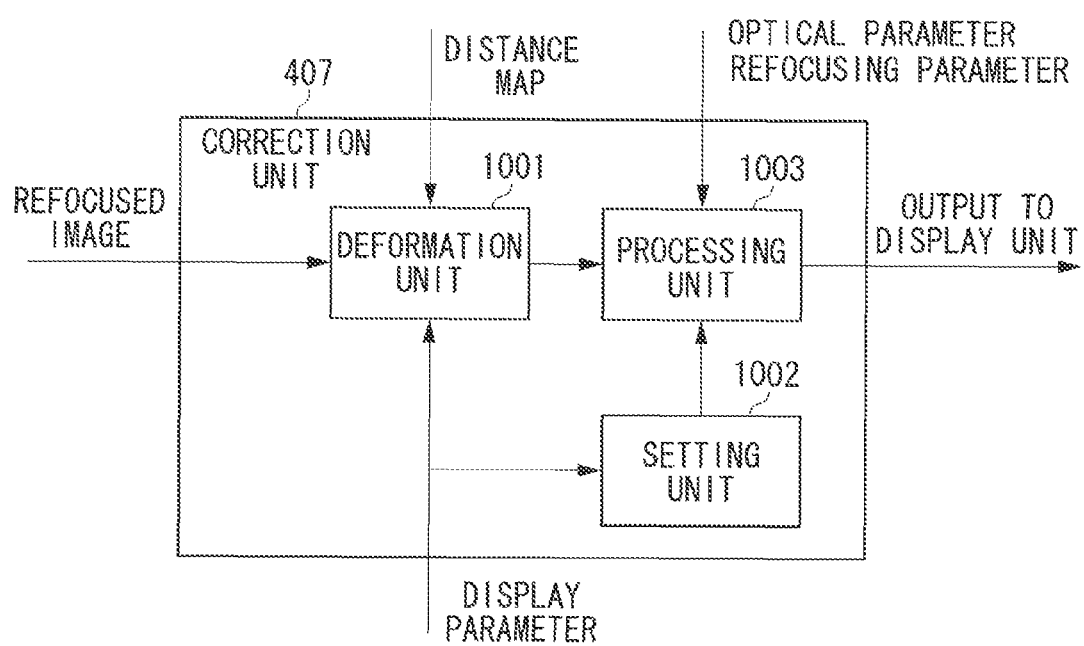
FIG. 10 is a block diagram illustrating a configuration of a correction unit.
Figure 11:
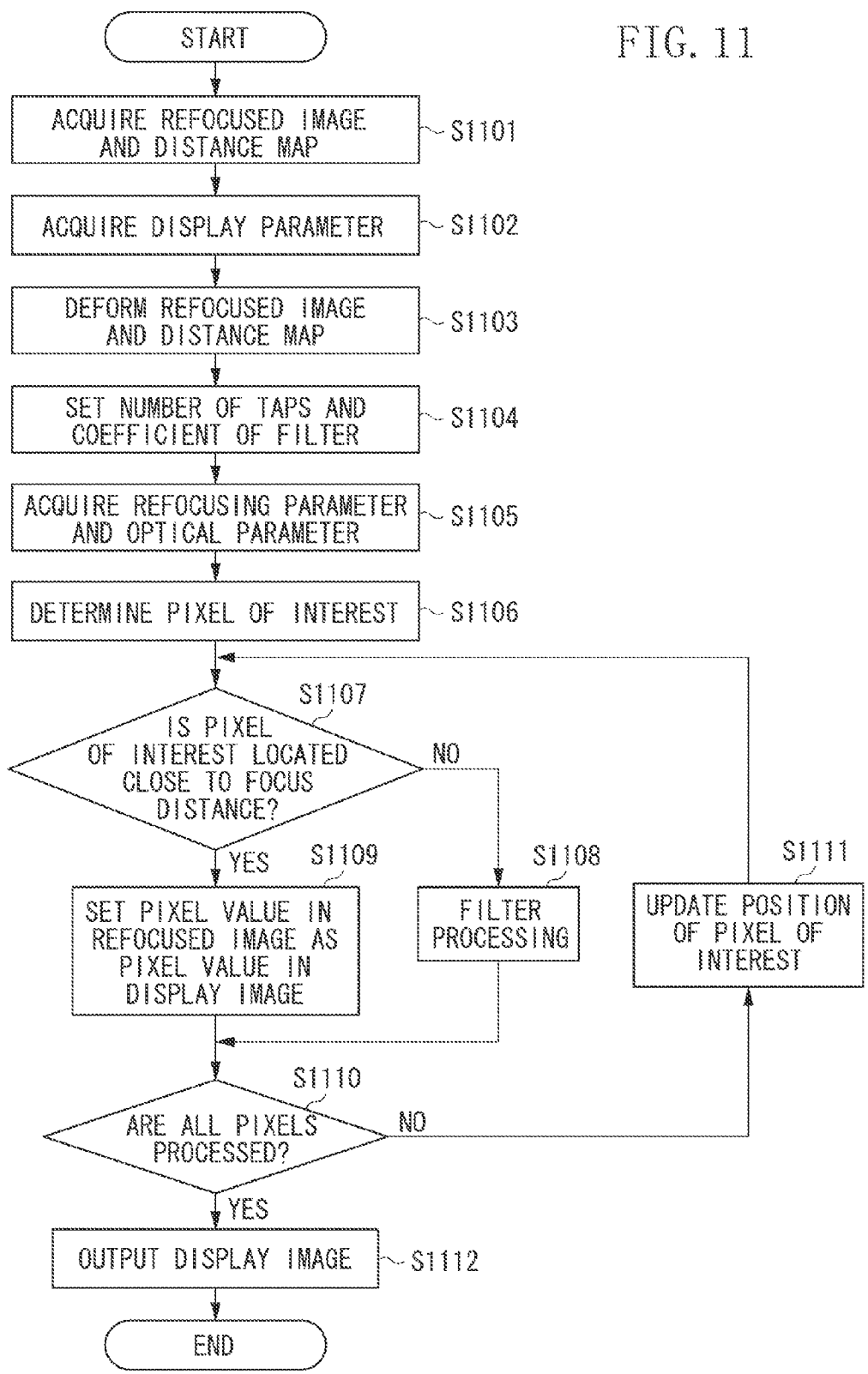
FIG. 11 is a flowchart illustrating a flow of processing performed by the correction unit according to the first exemplary embodiment.

This is the flow of the processing performed by the image processing unit 112 according to the present exemplary embodiment. Next, details of the processing performed by the correction unit 407 according to the present exemplary embodiment (step S507) will be described. FIG. 10 is a block diagram illustrating a configuration of the correction unit 407, and FIG. 11 is a flowchart illustrating a flow of the processing performed by the correction unit 407.

First, in step S1101, a deformation unit 1001 acquires the refocused image input from the combining unit 405 and the distance map input from the derivation unit 403. Next, in step S1102, the deformation unit 1001 and a setting unit 1002 acquire the display parameter input from the display parameter acquisition unit 406. In step S1103, the deformation unit 1001 deforms the refocused image and the distance map acquired in step S1101 based on the display parameter acquired in step S1102. In this step, the deformation unit 1001 resizes the refocused image and the distance map according to the resolution of the image displayable on the display unit 106. In the present exemplary embodiment, the resolution of the image displayable on the display unit 106 is lower than resolution of the refocused image and the distance map, whereby the deformation unit 1001 performs processing for reducing the refocused image and the distance map at this time. A known method such as the nearest neighbor method and the average pixel method can be used as the reduction processing. The deformation unit 1001 outputs the resized refocused image and distance map to a processing unit 1003 after completing resizing the refocused image and the distance map.

In step S1104, the setting unit 1002 determines the number of taps (a size) and a filter coefficient of a blur filter to be employed on the refocused image based on the display parameter acquired in step S1102. Assuming that $R_{comb}$ represents the resolution of the refocused image and $R_{disp}$ represents the resolution of the display image, the number of taps σ of the blur filter is expressed by the following expression.

$$\sigma = 2\sqrt{\frac{R_{comb}}{R_{disp}}} \qquad \text{Expression (2)}$$

For example, in a case where the number of effective pixels (the resolution) of the refocused image is 180×10⁶ pixels and the number of effective pixels of the display image is 20×10⁶ pixels, the number of taps σ of the filter is determined to be 6. Assuming that (x, y) represents coordinates of a pixel of interest that is a target of the filter, a filter coefficient c (k, l) at a pixel position (k, l) is expressed by the following expression.

$$c(k, l) = \frac{1}{2\pi\sigma} \exp\left[-\frac{(x-k)^2 + (y-l)^2}{2\sigma^2}\right] \qquad \text{Expression (3)}$$

After determining the number of taps and the coefficient of the filter based on the above-described expressions, the setting unit 1002 outputs these values to the processing unit 1003. In the present exemplar embodiment, the number of taps of the filter is determined from the resolution of the refocused image and the resolution of the display image, but how to determine the number of taps of the filter is not limited to the method according to the expression (2). For example, a fixed value may be set as the number of taps regardless of the resolution of the refocused image and the resolution of the display image. For example, an integer value, such as 3, 5, 8, and 16, can be set as the number of taps of the filter. However, determining the number of taps of the filter based on the resolution of the refocused image and the resolution of the display image as indicated by the expression (2) allows the blur to be emphasized according to deterioration of the resolution due to the reduction of the image, and therefore can result in acquisition of an image blurred to a degree closer to the blur of the image before the reduction. Further, the coefficient of the filter is also not limited to the Gaussian coefficient expressed by the expression (3), because the coefficient of the filter may be any coefficient capable of realizing the blur processing. For example, the imaging apparatus according to the present exemplary embodiment may be configured to use the smoothing filter, in which all filter coefficients are set to the same value.

In step S1105, the processing unit 1003 acquires the refocusing parameter input from the focus acquisition unit 404 and the optical parameter input from the optical parameter acquisition unit 402. In step S1106, the processing unit 1003 acquires the resized refocused image and distance map input from the deformation unit 1001, and determines a pixel of interest in the resized refocused image. The pixel of interest determined at this time is a pixel set as a target of a determination of whether to perform the filter processing on this pixel, and an uppermost and leftmost pixel in the refocused image is selected first. The selection of the pixel described here is one example, and any pixel may be selected as the first pixel of interest.

In step S1107, the processing unit 1003 compares the refocusing parameter acquired in step S1105 and the distance map acquired in step S1106 to determine whether the pixel of interest is a target pixel of the filter processing. At this time, if the object distance corresponding to the pixel of interest is not located close to the in-focus distance in the refocused image that is indicated by the refocusing parameter, the processing unit 1003 determines that this pixel of interest is the target pixel of the filter processing. More specifically, if the object distance d (x, y) corresponding to the pixel of interest (x, y) satisfies the following inequality expression, the pixel of interest (x, y) is determined to be located close to the in-focus distance.

$$d_{focus} - D_{front} \le d(x,y) \le d_{focus} + D_{rear} \qquad \text{Expression (4)}$$

In this expression, $d_{focus}$ represents the in-focus distance in the refocused image that is indicated by the refocusing parameter, and $D_{front}$ and $D_{rear}$ represent a near depth of field and a far depth of field of the refocused image, respectively. Assuming that c represents a permissible confusion circle diameter of the imaging unit 100, F represents an effective f-number of the imaging unit 100, and f represents a focal length of the imaging unit 100, $D_{front}$ and $D_{rear}$ are expressed by the following expressions, respectively.

$$D_{front} = \frac{\varepsilon F d_{focus}^2}{f^2 - \varepsilon F d_{focus}} \quad \text{Expression (5)}$$

$$D_{rear} = \frac{\varepsilon F d_{focus}^2}{f^2 + \varepsilon F d_{focus}} \quad \text{Expression (6)}$$

The processing unit 1003 substitutes the refocusing parameter and the optical parameter acquired in step S1105 into the above-described expressions (4) to (6), and determines whether the pixel of interest is the target pixel of the filter processing. If the processing unit 1003 determines that the pixel of interest is the target pixel of the filter processing (NO in step S1107), the processing proceeds to step S1108. If the processing unit 1003 determines that the pixel of interest is not the target pixel of the filter processing (YES in step S1107), the processing proceeds to step S1109.

The near depth of field $D_{front}$ and the far depth of field $D_{rear}$ used in the above-described determination may be calculated in advance with respect to each in-focus distance, and stored in the RAM 102, the ROM 103, or the like. Further, the processing unit 1003 may be configured to make the above-described determination based on whether the object distance corresponding to the pixel of interest falls within a range defined by a predetermined threshold value from the in-focus distance, without using the depth of field in the above-described determination. For example, the processing unit 1003 can make the determination in this manner by reaching the determination based on whether the difference between the in-focus distance and the object distance is the predetermined threshold value or smaller, such as determining that the pixel of interest is not the target pixel of the filter if the distance d at the position of the pixel of interest falls within a range of 1 m from the in-focus distance $d_{focus}$ in front of and at the back of the in-focus distance $d_{focus}$.

In step S1108, the processing unit 1003 performs the filter processing on the pixel of interest in the refocused image with use of the filter having the number of taps and the coefficient input from the setting unit 1002. Then, the processing unit 1003 sets a result of the filter processing as a pixel value of a pixel located at the same position as the pixel of interest in the display image. Assuming that $I_{comb}(x, y)$ represents a pixel value of the pixel located at the pixel position (x, y) in the refocused image, a pixel value $I_{disp}(x, y)$ of a pixel located at the pixel position (x, y) in the display image is expressed by the following expression.

$$I_{disp}(x,y) = \Sigma_{k=x-\sigma/2}^{x+\sigma/2} \Sigma_{l=y-\sigma/2}^{y+\sigma/2} c(k,l) I_{comb}(k,l) \quad \text{Expression (7)}$$

The processing unit 1003 substitutes the pixel value in the refocused image and the filter coefficient into the above-described expression (7) to acquire the pixel value in the display image, and then the processing proceeds to step S1110.

In step S1109, the processing unit 1003 sets the pixel value of the pixel of interest in the refocused image as the pixel value at the same pixel position in the display image. In other words, if the pixel of interest is not the target of the filter processing, $I_{disp}(x, y)$ is expressed by the following expression.

$$I_{disp}(x,y) = I_{comb}(x,y) \quad \text{Expression (8)}$$

The processing unit 1003 sets the pixel value in the display image based on the above-described expression (8), and then the processing proceeds to step S1110.

In step S1110, the processing unit 1003 determines whether the processing is performed on all pixels in the refocused image. If the processing unit 1003 determines that the processing is performed on the all pixels in the refocused image (YES in step S1110), the processing proceeds to step S1112. If the processing unit 1003 determines that the processing is not performed on the all pixels in the refocused image (NO in step S1110), the processing proceeds to step S1111. In step S1111, the processing unit 1003 sets a new pixel that has never been selected as the pixel of interest in the processing until this time, as the pixel of interest, and then the processing returns to step S1107. In step S1112, the processing unit 1003 outputs the generated display image to the display control unit 107, and then the processing is ended.

This is the processing for generating the display image in the present exemplary embodiment. According to the above-described processing, the user can easily determine the region in focus in the refocused image due to the emphasized blurs of the objects other than the object in focus in the refocused image. This allows the user to more intuitively set the refocusing parameter, and easily acquire a desired refocused image. In the above-described exemplary embodiment, the processing unit 1003 determines whether the pixel of interest is the target of the filter processing based on the object distance of the pixel of interest, but may make the above-described determination with use of the pixel displacement amount l (x, y) between the criterion viewpoint and the reference viewpoint before the derivation unit 403 converts the pixel displacement amount into the distance. In this case, the processing unit 1003 determines whether the pixel of interest is the target of the filter processing with use of the following inequality expression.

$$l_{focus} - s \le l(x,y) \le l_{focus} + s \quad \text{Expression (9)}$$

In this expression, $l_{focus}$ represents the pixel displacement corresponding to the object located at the in-focus distance. Further, s represents an allowable shift amount of the pixel that is determined to be in focus (not blurred) in the refocused image. In the present example, the allowable shift amount is set to s=1 (pixel), but the allowable shift amount s may be determined in consideration of the resolution of the refocused image and the resolution of the display image. For example, the allowable shift amount s may be determined according to the following expression.

$$s = \sigma = 2\sqrt{\frac{R_{comb}}{R_{disp}}} \quad \text{Expression (10)}$$

Further, in step S1109, the processing unit 1003 sets the pixel value in the refocused image as the pixel value in the display image without any adjustment made thereto, with respect to the pixel position corresponding to the object located close to the in-focus distance, but may be configured to also perform filter processing on even the pixel located at this position. In this case, the proceeding unit 1003 performs filter processing for further emphasizing sharpness of the object located close to the in-focus distance. For example, the processing unit 1003 generates an image with an emphasis placed on a high band of a frequency component of the image with use of a filter expressed by the following expression.

$$I_{disp}(x,y) = I_{comb}(x,y) + [I_{comb}(x,y) - \Sigma_{k=x-\sigma/2}^{x+\sigma/2} \Sigma_{l=y-\sigma/2}^{y+\sigma/2} c(k,l) I_{comb}(k,l)] \quad \text{Expression (11)}$$

The filter for emphasizing the high band of the frequency component of the image is not limited to the expression (11), and the high band emphasis processing may be realized with use of another filter. Further, the processing unit 103 may be configured to perform the high band emphasis processing in a frequency space after transforming the refocused image into the frequency space with use of the Fourier transform. In the case where the above-described high band emphasis processing is performed, the processing with use of the blur filter that is performed in step S1108 may be omitted. In either case, the processing may be performed in any manner as long as the processing can result in generation of an image in which an emphasis is placed on the object located close to the in-focus distance compared to the object located at the other distance, thereby allowing these objects to be easily distinguished from each other.

Values stored in the ROM 103 in advance may be used as the various kinds of parameters illustrated in FIG. 5, and in this case, the corresponding acquisition steps may be omitted. Further, in a case where the change in the focus position is omitted, steps S509 and S510 can be omitted.

In the present exemplary embodiment, the image acquisition unit 401 functions as an acquisition unit configured to acquire image data representing a captured image. Further, the focus acquisition unit 404 functions as a first input unit configured to input a first user instruction indicating an in-focus position in a refocused image. Further, the correction unit 407 functions as a first generation unit configured to generate a display image to be displayed to a user based on the first user instruction. Further, the instruction acquisition unit 408 functions as a second input unit configured to input a second user instruction, which is an image output instruction, input onto the display image. Further, the output unit 409 functions as an output unit configured to output the refocused image in focus at the in-focus position indicated by the first user instruction according to the second user instruction. Further, the combining unit 405 functions as a second generation unit configured to generate the refocused image in focus at the in-focus position indicated by the first user instruction from the image data based on the first user instruction. Further, the setting unit 1002 functions as a determination unit configured to determine a size of a blur filter based on resolution of the refocused image in focus at the in-focus position indicated by the first user instruction, and resolution of a display unit configured to display the display image. Further, the derivation unit 403 functions as a distance acquisition unit configured to acquire distance information indicating an object distance corresponding to each pixel in the image represented by the image data.

Further, the above-described exemplary embodiment has been described based on the example in which the image is displayed on the display having the low resolution. However, even for a display having high resolution, the above-described exemplary embodiment provides an effect of allowing the user to easily make a determination compared to displaying the refocused image without any arrangement made thereto.

The first exemplary embodiment has been described as the configuration that generates the corrected image of the refocused image generated by combining the parallax image data as the display image. A second exemplary embodiment will be described as a configuration that uses a corrected image of a single image among the images represented by the parallax image data as the display image, instead of using the refocused image. A configuration of an imaging apparatus according to the present exemplary embodiment is similar to the configuration described in the first exemplary embodiment, whereby a description of the configuration of the imaging apparatus will be omitted below.

Figure 12:
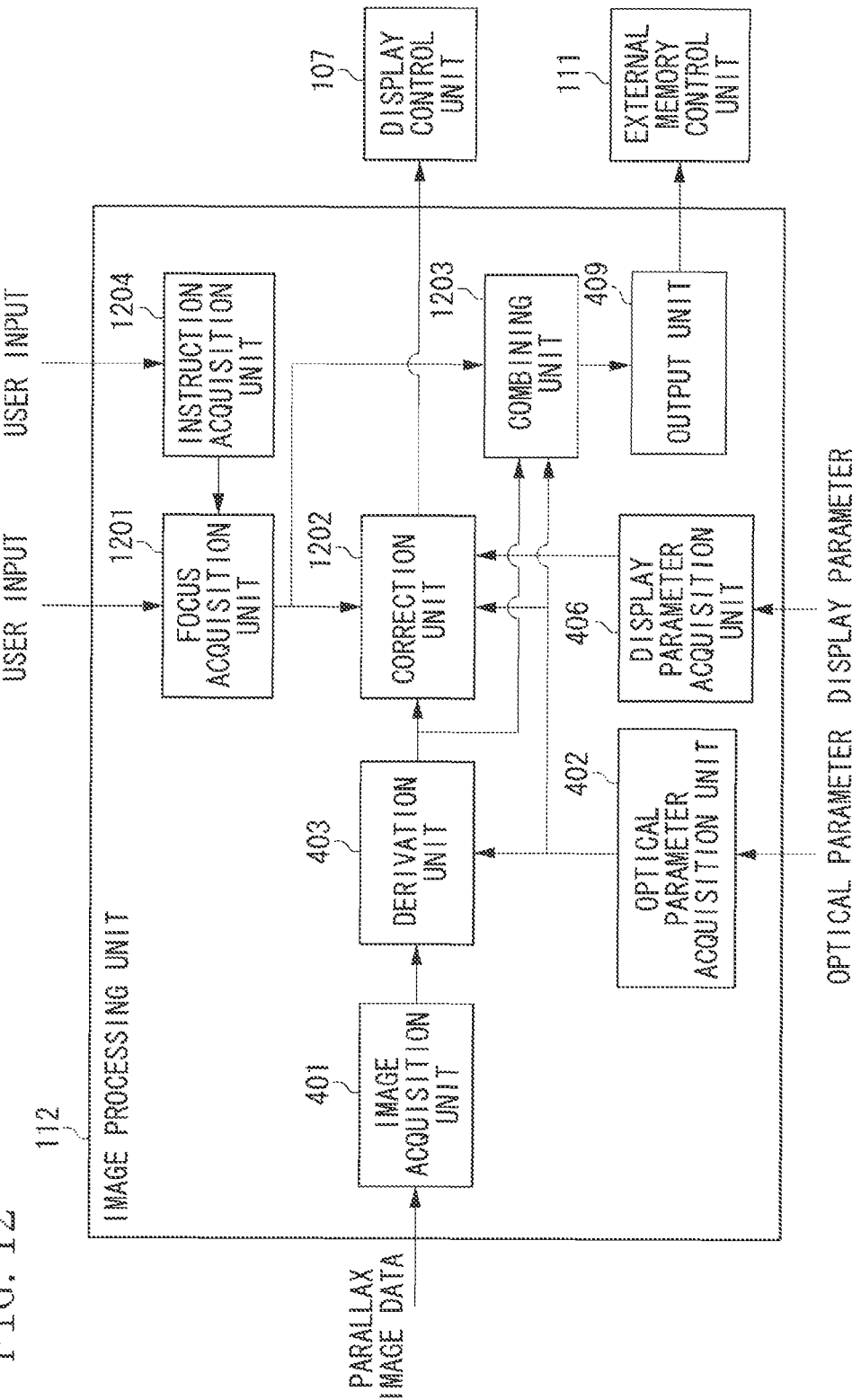
FIG. 12 is a block diagram illustrating a configuration of an image processing unit according to a second exemplary embodiment.
Figure 13:
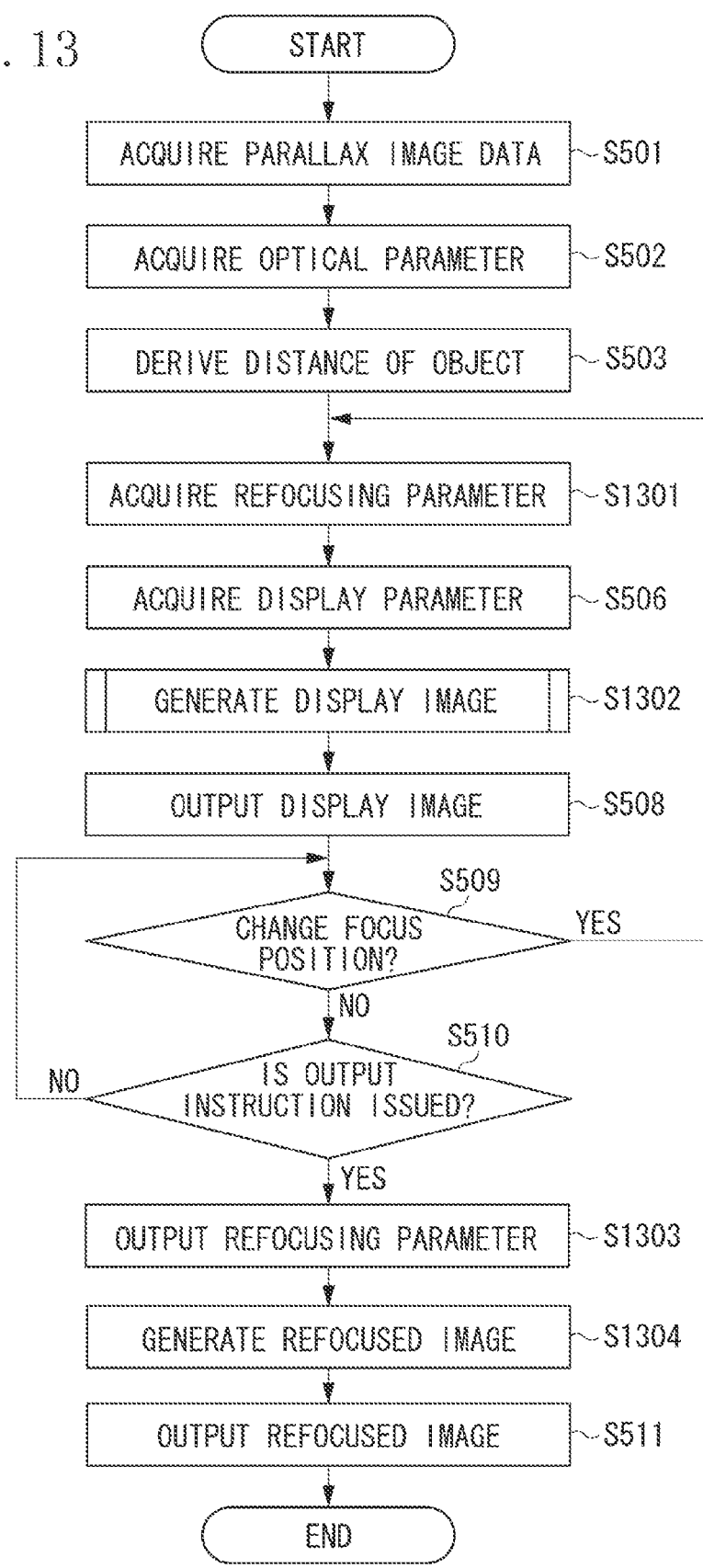
FIG. 13 is a flowchart illustrating a flow of processing according to the second exemplary embodiment.

In the following description, processing performed by the image processing unit 112 according to the second exemplary embodiment will be described with reference to a block diagram illustrated in FIG. 12 and a flowchart illustrated in FIG. 13. FIG. 12 illustrates functional blocks of the image processing unit 112 according to the second exemplary embodiment. Similar components to the first exemplary embodiment are identified by the same reference numerals as the reference numerals used in FIG. 4. In the flowchart illustrated in FIG. 13, steps similar to the first exemplary embodiment are also indicated by the same step numbers as the step numbers used in FIG. 5, and descriptions thereof will be omitted below. In the following description, only a difference from the first exemplary embodiment will be described.

In step S1301, a focus acquisition unit 1201 acquires the refocusing parameter indicating the in-focus position at which the image is to be brought into focus in the refocusing processing that is input by the user. In this processing, the focus acquisition unit 1201 outputs the refocusing parameter only to a correction unit 1202, unlike step S504.

In step S1302, the correction unit 1202 generates the display image to be displayed on the display unit 106 by correcting the parallax image data input from the derivation unit 403. In this step, the correction unit 1202 generates the display image by correcting a single image among the images represented by the parallax image data, instead of using the refocused image, unlike step S507 in the first exemplary embodiment. The image used at this time is the image corresponding to the criterion viewpoint that has been used when the derivation unit 403 has derived the distance map. Details of image processing performed in this step are similar to the processing according to the first exemplary embodiment illustrated in FIG. 11 except for the replacement of the refocused image used in the processing with the single image among the images represented by the parallax image data, whereby a description thereof will be omitted below.

If the instruction to output the refocused image is issued by the user (YES in step S510), in step S1303, an instruction acquisition unit 1204 outputs a command to output the refocused image to the focus acquisition unit 1201, and the focus acquisition unit 1201 outputs the refocusing parameter at that time to a combining unit 1203. In step S1304, the combining unit 1203 generates the refocused image with use of the refocusing parameter input from the focus acquisition unit 1201, and the parallax image data and the distance map input from the derivation unit 403. Then, in step S511, the combining unit 1203 outputs the refocused image, and the processing is ended.

This is the processing performed by the imaging apparatus according to the second exemplary embodiment. According to the above-described processing, the imaging apparatus can switch the display image more quickly because the imaging apparatus does not have to perform the processing for generating the refocused image every time the refocusing parameter is changed, which can reduce stress for the user when the refocusing parameter is set.

The above-described exemplary embodiments have been described as the configurations that use the image generated by combining the images of the plurality of viewpoints represented by the parallax image data while shifting them as the refocused image. The method for generating the refocused image is not limited to this method, and for example, the imaging apparatus may be configured to use an image generated by subjecting one of the images represented by the parallax image data to a blur filter having a size and a strength varying according to the difference between the object distance corresponding to each pixel and the in-focus distance, as the refocused image. In the case where the imaging apparatus uses such an image as the refocused image, the input image data does not necessarily have to be the parallax image data, and all that should be input is only a single image containing the object and the distance map corresponding thereto. Even in the case where the imaging apparatus uses such an image as the refocused image, the present invention can be realized by configuring the imaging apparatus in such a manner that the region in focus in the refocused image is emphasized in the display image. In other words, in the case where the imaging apparatus emphasizes the in-focus region by applying the blur filter to the region out of focus in the refocused image, this configuration results in an output of an image less blurred, which is processed by a blur filter weaker than the display image, as the output image.

Further, in the first exemplary embodiment, the imaging apparatus newly generates the refocused image every time the refocusing parameter based on the user input is changed, but how the refocused image is generated is not limited to this example. For example, the imaging apparatus may be configured to generate a plurality of refocused images corresponding to different in-focus positions and store them in the RAM 102, the RAM 103, or the external storage device in advance, and select one image from the generated refocused images based on a user input to read out and output the selected image. Further, not only the imaging apparatus may be configured to select the one image based on the user input to output the selected image, but also the imaging apparatus may be configured to read in all of the refocused images, add flag information to the one image selected by the user, and then output all of the refocused images.

Figure 14A:
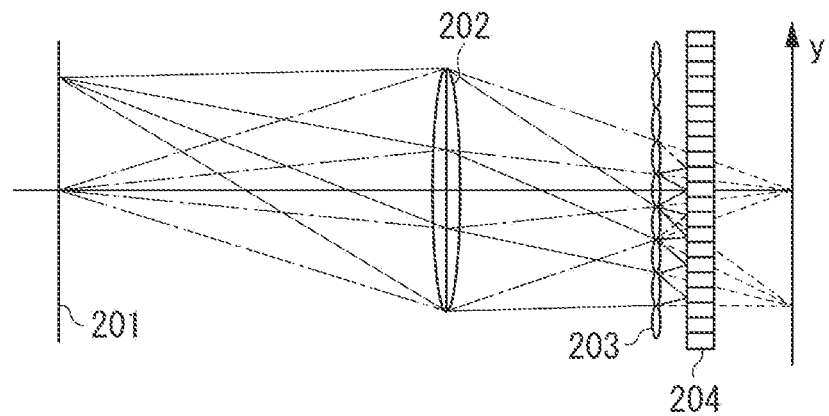
FIGS. 14A, 14B, and 14C each illustrate a modification example of the configuration of the imaging unit.
Figure 14B:
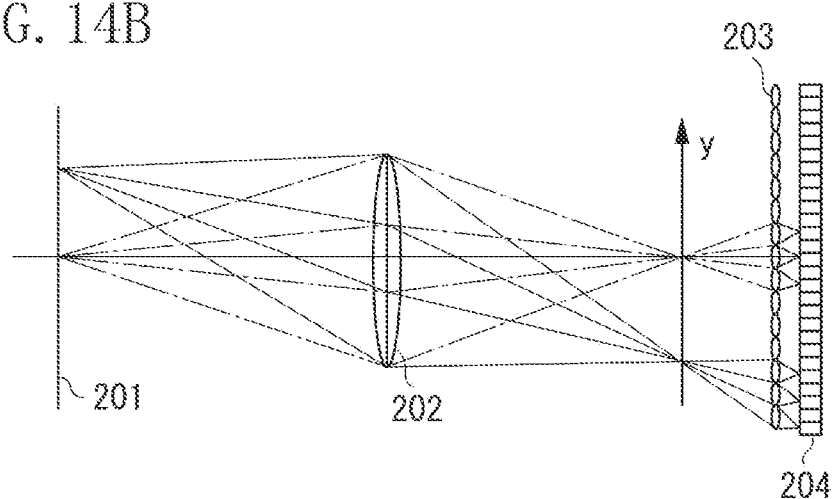
Figure 14C:
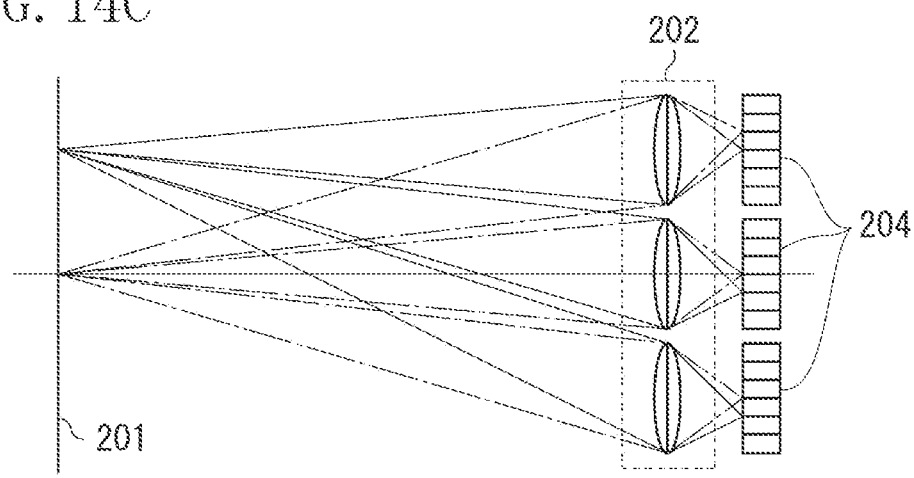

Further, the configuration of the imaging unit 100 for imaging the parallax image data is not limited to the Plenoptic camera described in the first exemplary embodiment. For example, the imaging apparatus may use imaging units configured as illustrated in FIGS. 14A, 14B, and 14C. In the configuration illustrated in FIG. 14A, the lens array 203 is disposed at a position closer to the main lens 202 than the image-side conjugate plane of the object surface 201 is to the main lens 202. Further, in the configuration illustrated in FIG. 14B, the lens array 203 is disposed at a position farther away from the main lens 202 than the image-side conjugate plane of the object surface 201 is to the main lens 202. In both of these configurations, the light ray emitted from the object surface 201 is imaged on the image sensor 204 by the lens array 203, unlike the configuration described in the first exemplary embodiment. Therefore, an image showing a partial region of the object, instead of the image in which the light rays emitted from one point on the object are divided for each incident direction, like the first exemplary embodiment, is formed as the image corresponding to each convex lens in the lens array 203 that is formed on the image sensor 204. Such a configuration leads to a more complicated relationship established between the light ray direction and the pixel position than the configuration described in the first exemplary embodiment, but even in such a configuration, the light rays emitted from the same object are incident on individually different pixels on the image sensor 204 according to the directions in which the light rays are emitted. The corresponding relationship therebetween can be calculated based on the optical parameter in a similar manner to the imaging unit 100 configured as described in the first exemplary embodiment. Therefore, even in the case where the imaging apparatus uses the imaging units configured as illustrated in FIGS. 14A and 14B, the imaging apparatus can generate the parallax image data by extracting the pixels corresponding to the light rays in the same direction. Further, the imaging apparatus may also use the imaging unit configured as illustrated in FIG. 14C. The configuration of the imaging unit illustrated in FIG. 14C is a configuration including a plurality of camera units, each of which captures the object from a different viewpoint. In this configuration, an image corresponding to the individually different viewpoint is captured by each of the camera units, whereby the imaging apparatus can directly use an output from each of the camera units as the parallax image data.

The present invention can be also realized by processing of supplying a program for realizing one or more functions of the above-described exemplary embodiments to a system or an apparatus via a network or a storage medium, and causing one or more processors in a computer of this system or apparatus to read out and execute the program. Further, the present invention can be also realized by a circuit (e.g., an application specific integrated circuit (ASIC)) capable of realizing one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image processing apparatus comprising:
    an acquisition unit configured to acquire image data representing a captured image;
    a first input unit configured to input a first user instruction indicating an in-focus position of a refocused image for generating the refocused image, wherein the in-focus position is a position to be in focus in an image and the refocused image is an image in which the in-focus position of the captured image represented by the image data is changed;
an output unit configured to output the refocused image in focus at the in-focus position according to the first user instruction,
wherein the refocused image output by the output unit is an image in which an image region corresponding to the in-focus position is emphasized compared to in the refocused image in focus at the in-focus position.

2. The image processing apparatus according to claim 1, further comprising:
a storage unit configured to store a plurality of refocused images generated based on the image data and each corresponding to a different in-focus position; and
a selection unit configured to select at least one refocused image from the plurality of refocused images according to the first user instruction,
wherein the output unit output the refocused image by correcting the selected refocused image.

3. The image processing apparatus according to claim 1, wherein the output unit outputs, as the refocused image, an image in which an object located at the in-focus position is emphasized by applying a blur filter to an out-of-focus region different from an in-focus region in focus in the refocused image that is in focus at the in-focus position.

4. The image processing apparatus according to claim 3, further comprising a determination unit configured to determine a size of the blur filter based on resolution of the refocused image in focus at the in-focus position, and resolution of a display unit configured to display the refocused image,
wherein the output unit performs filter processing on the refocused image in focus at the in-focus position with use of the blur filter having the determined size.

5. The image processing apparatus according to claim 1, wherein the output unit outputs, as the refocused image, an image in which an object located at the in-focus position is emphasized by applying a filter for emphasizing a high-band frequency component to an in-focus region in focus in the refocused image that is in focus at the in-focus position.

6. The image processing apparatus according to claim 1, wherein the output unit outputs, as the refocused image, an image in which an emphasis is placed on a contour of an object located in an in-focus region in focus in the refocused image that is in focus at the in-focus position.

7. The image processing apparatus according to claim 1, wherein the output unit outputs, as the refocused image, an image in which a marker is superimposed on a vicinity of an object located in an in-focus region in focus in the refocused image that is in focus at the in-focus position.

8. The image processing apparatus according to claim 1, wherein the image data is parallax image data representing a plurality of images corresponding to different viewpoints, and
wherein the refocused image in focus at the in-focus position is an image generated by combining the plurality of images represented by the parallax image data while shifting them based on the in-focus position.

9. The image processing apparatus according to claim 1, wherein the refocused image in focus at the in-focus position is an image generated by applying a blur filter based on an object distance to the image represented by the image data.

10. The image processing apparatus according to claim 1, further comprising a distance acquisition unit configured to acquire distance information indicating an object distance corresponding to each pixel in the image represented by the image data,
wherein the output unit determines the image region corresponding to the in-focus position in the image data based on the acquired distance information, and outputs the refocused image based on a result of this determination.

11. An image processing method comprising:
acquiring image data representing a captured image;
inputting, as first inputting, a first user instruction indicating an in-focus position of a refocused image for generating the refocused image, wherein the in-focus position is a position to be in focus in an image and the refocused image is an image in which the in-focus position of the captured image represented by the image data is changed;
outputting the refocused image in focus at the in-focus position according to the first user instruction,
wherein the refocused image output by the output unit is an image in which an image region corresponding to the in-focus position is emphasized compared to in the output refocused image in focus at the in-focus position.

* * * * *